Figure 1:
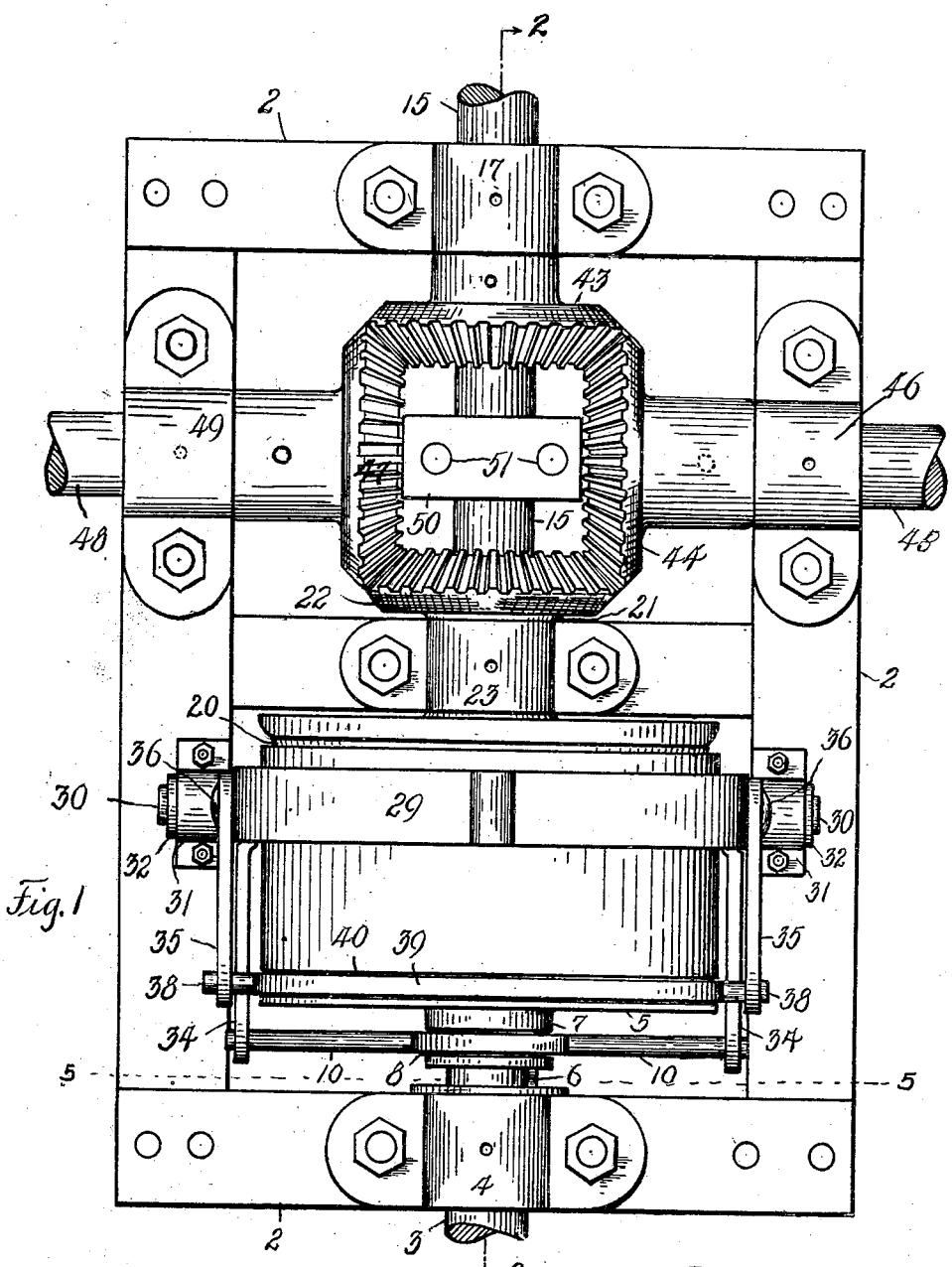

J. M. VAN DYKE & F. R. ROWELL.
TRANSMISSION GEARING.
APPLICATION FILED SEPT. 8, 1908.

921,754.

Patented May 18, 1909.
3 SHEETS—SHEET 1.

WITNESSES:
H. N. Henderson
A. L. Wallace

INVENTORS:
John M. Van Dyke.
Fayette R. Rowell.
By Harry De Wallace
ATTORNEY.

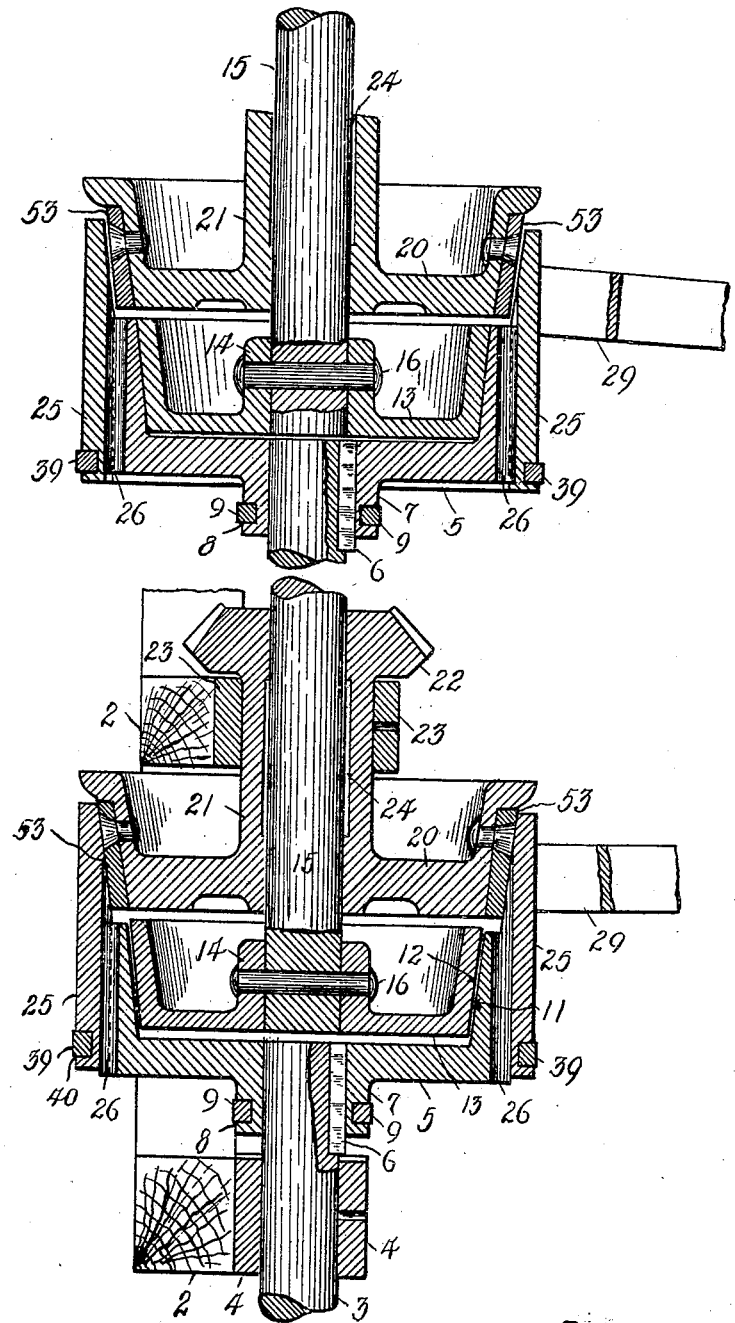

J. M. VAN DYKE & F. R. ROWELL.
TRANSMISSION GEARING.
APPLICATION FILED SEPT. 8, 1908.

921,754.

Patented May 18, 1909.
3 SHEETS—SHEET 3.

WITNESSES:
H. N. Henderson
R. L. Wallace

INVENTORS:
John M. Van Dyke.
Fayette R. Rowell.
By Harry De Wallace
ATTORNEY.

UNITED STATES PATENT OFFICE.

JOHN M. VAN DYKE AND FAYETTE R. ROWELL, OF CANASTOTA, NEW YORK.

TRANSMISSION-GEARING.

No. 921,754.            Specification of Letters Patent.           Patented May 18, 1909.

Application filed September 8, 1908. Serial No. 451,951.

*To all whom it may concern:*

Be it known that we, JOHN M. VAN DYKE and FAYETTE R. ROWELL, citizens of the United States, residing at Canastota, in the county of Madison and State of New York, have invented certain new and useful Improvements in Transmission - Gearing, of which the following is a specification.

This invention relates to improvements in transmission gearing, designed for use in connection with motor driven boats, automobiles and shop machinery, and the invention relates particularly to a transmission gearing which is capable of being reversed at will, for the purpose of driving a machine, or other part, in different directions without requiring alteration or interchange of the parts.

The object of the invention is to provide a simple, compact, durable and inexpensive gearing, which is capable of being applied to a large variety of uses, and is adapted for driving one or more machines in different directions at the same time.

A further object is to provide a gearing in which a machine or car may be started, stopped or reversed in a simple manner at will.

The invention consists principally of a shaft which is capable of being operatively attached to an engine or motor and positively driven thereby.

The invention further consists of a pair of friction clutches, each comprising a hollow cone, both of said cones adjustably mounted upon and driven by the driving-shaft, and corresponding male cones, one of which is mounted rigidly upon a secondary shaft disposed axially in line with the driving-shaft, the other male cone loosely journaled on the secondary shaft, all of said cones forming a reversible transmission mechanism, capable of being set in different positions alternately, to drive a machine in different directions, or to start or stop the same.

The invention further consists of a series of miter-gears all operatively connected, one of said gears being positively driven by one of the clutches, the opposite gear being positively driven by the other clutch through its connection with the secondary shaft. And, the invention further consists of an operating-lever arranged to coöperate with a pair of yokes carried by the hollow cones, and a series of links for operating the clutches independently, for driving a machine in different directions as well as for disconnecting both of the clutches and stopping the machine.

Other features and parts of the invention will be understood from the detail description which follows, and by reference to the accompanying drawings which form a part of this specification, and in which—

Figure 4:
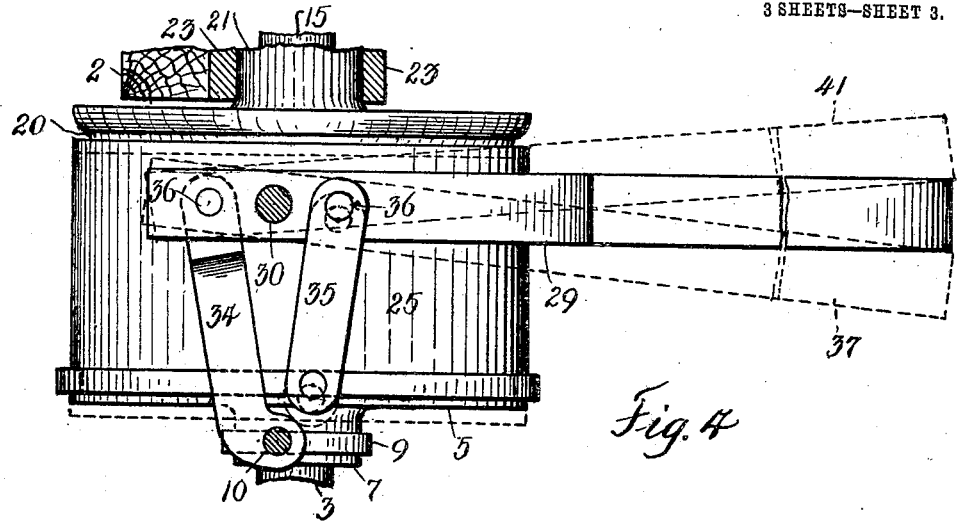
Figure 5:
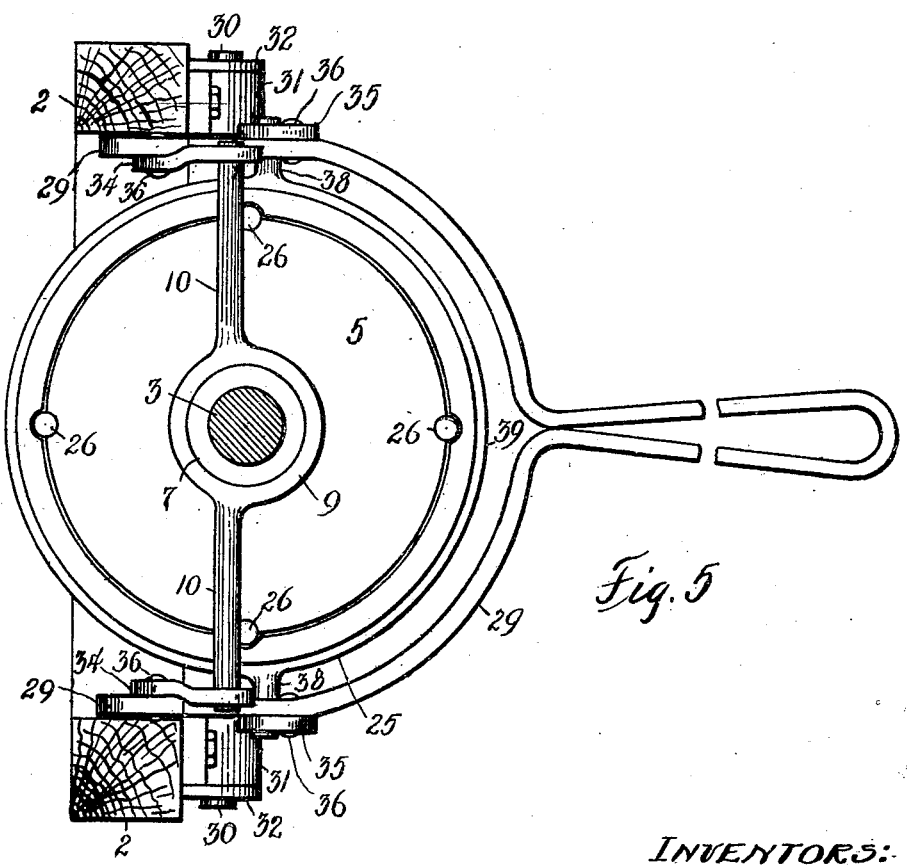

Figure 1 is a face view of the complete device, showing the construction and arrangement of the same, the operating-lever being shown set in central position for disconnecting both clutches and stopping a machine. Fig 2 is a part longitudinal section, substantially on the line 2—2 of Fig. 1, showing the construction and arrangement of the double clutch parts; also showing the outer clutch in engagement, for transmitting the power from the engine to the miter-gears, then to the secondary shaft and a machine. Fig. 3 is a similar view, also on the line 2—2 of Fig. 1, showing the inner clutch in engagement for transmitting the power direct to the secondary shaft and then to the miter-gears and a machine. Fig. 4 is a side elevation of the clutch parts, the full lines showing the operating lever in position to disengage both of the clutches; the left dotted lines showing the position of the lever for engaging the outer clutch, as illustrated in Fig. 2; the right dotted lines showing the position of the lever for engaging the inner clutch, as illustrated in Fig. 3. Fig. 5 is a transverse section on the line 5—5 of Fig. 1, showing the hollow cones; also showing the disposition and arrangement of the yokes and their operating connections.

Similar characters of reference are assigned to corresponding parts throughout the several views.

In the drawings, 2 represents a frame for supporting the transmission gearing, which may be constructed in any suitable manner and of any material, as wood or metal.

3 represents a driving-shaft which is journaled to one end of the frame by means of a box or bearing 4. Shaft 3 is preferably connected to an engine or motor or a driven-member of such, from which the device derives its operating power.

5 represents a hollow cone bored out centrally and slidably mounted upon shaft 3 and driven by means of a feather or key 6, which permits the hollow cone to be moved reciprocally on shaft 3.

7 represents an integral hub formed centrally on the outer face of cone 5, and having an annular groove 8, in which is fitted a yoke 9, provided with oppositely disposed arms 10, which extend slightly beyond the sides of the hollow cones. Shaft 3 is so disposed that its inner end is about flush with the inner face of hollow cone 5, when the latter is shifted to its inner position away from the bearing 4. Hollow cone 5 is cup-shaped and provided with a beveled or inclined annular portion or face 11, which is adapted to receive and frictionally grip a corresponding surface 12, of a concentric cone 13, when these two parts are brought together as a clutch (see Fig. 3). The body of male cone 13, for economy in construction and for convenience in applying, is also formed hollow and provided with a central hub 14, bored out to receive a secondary shaft 15, to which it is rigidly secured, as by a pin 16. Shaft 15 is disposed in the same axial line as shaft 3, and extends rearwardly across frame 2, and is held in operative position near its outer end by a bearing-box 17 supported at the opposite end of the frame.

20 represents a male cone loosely journaled on shaft 15 near cone 13, and having a diameter slightly greater than the latter. Cone 20 is provided with a rearwardly extending central hub 21, upon the outer end of which is formed a miter-gear 22. Cone 20, hub 21 and gear 22 are preferably formed integrally, although they may be made in separate parts and rigidly connected in any suitable manner afterward. To support clutch member 20, in operative position, and the inner end of shaft 15 in line with shaft 3, and also to hold the clutch members carried by said shafts concentric to those carried by shaft 15, a bearing-box 23 is provided to receive the hub 21 of cone 20. This bearing is mounted upon a central beam or part of the frame. Hub 21 is counter-bored at 24 to prevent over-heating of the long bearing in which shaft 15 operates.

25 represents a hollow cone or member cylindrical in form, for engaging and driving the cone 20. Cone 25 is mounted upon and telescopes cone 5, being fitted to the same like a loose shell, and is slidable longitudinally on cone 5, and also is driven or rotated with said cone, by means of a series of guide rods or ribs 26, which are preferably made rigid in the outer surface of cone 5, as shown in Figs. 2, 3 and 5. The guides 26 are shown as rods disposed in semi-circular grooves formed in cone 5; but they may consist of integral ribs and serve their purpose equally well. The inner surface of the female cone 25 is provided with corresponding grooves to receive the guides 26.

29 represents a lever for operating the two friction clutches, and is preferably made in the form of a fork, as shown in Fig. 5. This lever is pivoted in suitable manner to each side of the frame, as shown in Figs. 1 and 5, by means of trunnions 30, which are pivoted in bearings 31 secured to frame 2, the trunnions being held in place by collars 32. To operate the driving cones 5 and 25, and to set them in different positions, to effect the starting, stopping or reversing of a machine, we provide at each side of the machine a pair of links 34 and 35, which have their outer ends pivoted to lever 29 by bolts or rivets 36. The inner ends of links 34 are perforated to receive the ends of arms 10 of yoke 9, which is employed for operating hollow cone 5 on shaft 3, to engage cone 13, when lever 29 is thrown into the position shown by full lines in Fig. 3, and by dotted lines 37 in Fig. 4, as well as to disengage said cones when the lever is moved in the opposite directions. Links 35 have their inner ends perforated to receive arms 38 of a second yoke 39, which plays in an annular groove 40 formed around the inner end of cone 25. To operate cone 25, to throw it into engagement with male cone 20, the operator must swing lever 29 to the position shown by full lines in Fig. 2, and by dotted lines 41 in Fig. 4. When lever 29 is moved to the central position shown by full lines in Fig. 4, both clutches are disconnected and driving cones 5 and 25 may be rotated by shaft 3 without driving or operating the rest of the mechanism or a machine connected therewith.

43 represents a miter-gear rigidly mounted on shaft 15 adjacent the bearing 17. Gear 43 is connected with gear 22 by a miter-gear 44 which is mounted upon a transverse shaft 45, having a bearing in a box 46 mounted on the rear side of the frame.

47 represents a fourth miter-gear disposed opposite and concentric to gear 44, and also meshes with gears 22 and 43, as shown by dotted lines in Fig. 1. Gear 47 is mounted on a transverse shaft 48, having a bearing in a box 49 mounted on the front side of the frame. In practice it is preferred to employ both of the gears 44 and 47 disposed and arranged as shown in Fig. 1, but the device may be operated with but three gears, as shown by full lines in said figure. When four gears are employed, shafts 45 and 48 are preferably coupled or tied together in a rigid manner by a plate or clamp 50, which is rigidly attached to the inner ends of shafts 45 and 48 by means of rivets or bolts 51. Under this construction the idle gears 44 and 47 are held firmly in operative position and their respective shafts will not interfere with the shaft 15 upon which gears 22 and 43 are mounted. If desired for any purpose, gears 44 and 47 may be made rigid on shafts 45 and 48, and thus be employed for driving machines independently of shaft 15. In such case, the coupler 50 would have to be dispensed with in order to permit the rotation of the transverse shafts.

53 represents an annular shoe or belt rigidly fitted and secured to the inclined face of male cone 20, which may be made of fiber, leather, wood or metal, as desired, and forms one of the friction surfaces of the larger clutch. Cone 20 may be made entirely of the same material as the shoe 53, the cone 13 may also be made of any like material and fulfil the office of said parts. Hollow cones 5 and 25 may be made of any suitable material. The connection with the engine or other source of power may be made with either shaft 3 or shaft 15 and produce the same effect upon a driven machine, but we prefer to make such connection with shaft 3, and connect the machine or thing to be operated with shaft 15.

The operation of our complete gearing is as follows: Assuming that shaft 3 is driven by a motor or like source of power, that a machine or propeller is connected to the outer end of shaft 15, that lever 29 is in central position as indicated by full lines in Figs. 1 and 4, and that both of the clutches 5—13 and 25—20 are disengaged. The operator to start the machine in the right direction, takes hold of lever 29 and swings it down, as illustrated by full lines in Fig. 3, also by dotted lines in Fig. 4. The throwing of the lever in said direction through connecting links 34 and yoke 9, shifts hollow cone 5 into engagement with male cone 13, cone 5 sliding upon shaft 3. This action of the lever through links 35, will at the same time move cone 25 farther away from cone 20. If the engine is rotating shaft 3 to the right, cones 5 and 25 are rotated in the same direction by key 6 and guides 26, and as soon as the cones 5 and 13 become engaged, the latter will also be turned to the right, and cone 13 and also gear 43 being rigid on shaft 15, all of these parts will be driven in the same direction as shaft 3, and the machine attached to shaft 15 will also be driven to the right. The operation of gear 43 as described will rotate idle gears 44 and 47, and through them gear 22 and male cone 20 to the left, but all of these parts will be running idle while clutch 5—13 is driving the machine. Lever 29 may be locked in its different positions in any suitable manner, in order to prevent the accidental engagement or release of the clutches.

To reverse the transmission gear and also a machine or propeller, lever 29 should be shifted, as shown by full lines in Fig. 2 and by dotted lines 41 in Fig. 4. This operation of the lever will disconnect the cones of clutch 5—13, and by the same movement throw hollow cone 25 into engagement with cone 20. The shifting of the cones or clutches in the manner described may be done without shutting down the engine, or disconnecting shaft 15 and the machine, so that shaft 3 and cones 5 and 25 may continue to be rotated to the right the same as before. The engagement of clutch 25—20 will effect the driving of cone 20 and gear 22 to the right. Then gear 22 through the idle gears 44 and 47 will operate gear 43 and shaft 15 to which the latter gear is rigidly attached, to the left, thus reversing the travel of the machine. At the same time cone 13 which is rigid on the inner end of the shaft 15 will be rotated toward the left, while cone 20 is revolving in the same direction as shaft 3. It will be seen from the foregoing that the cones 13 and 20 by reason of the beveled gears always revolve in opposite directions.

It is obvious that our transmission gear may be employed in connection with automobiles, boat and other propellers, and also for transmitting power to machinery of different kinds, and that some changes and modifications may be made in the device, without departing from the spirit of our invention, and we therefore do not restrict ourselves to the precise construction and arrangement as herein shown and described.

Having thus described our invention, what we claim as new and desire to secure by Letters Patent, is—

1. In transmission gearing, the combination with a driving-shaft, and a secondary shaft disposed in the same axial line, of a clutch comprising a hollow cone adjustably mounted on said driving-shaft and a male cone rigidly mounted on said secondary shaft, a clutch comprising a cone adjustably mounted on said hollow cone and a cone journaled on said secondary shaft, a lever to operate both of said clutches simultaneously for engaging the members of one clutch and releasing the members of the other clutch, and also for releasing the members of both clutches, and gears associated with certain of said parts.

2. The combination with a driving-shaft and a secondary shaft operatively disposed in the same axial line, of a friction-clutch comprising one member adjustably mounted on said driving-shaft, a key to drive the same from the shaft, and a second member rigidly mounted on said secondary shaft, to drive the same in the same direction as said driving-shaft, a friction-clutch comprising a member adjustably mounted on one member of said first named clutch and driven therefrom, and a member journaled on said secondary shaft, means for operating said clutches simultaneously for either starting, stopping or reversing the secondary shaft, and gears connecting the secondary shaft with the clutch member journaled thereon.

3. The combination with a driving-shaft and a secondary shaft operatively disposed in the same axial line, of a friction-clutch comprising one member adjustably mounted on said driving-shaft and a second member rigidly mounted on said secondary shaft, to drive the same in the same direction as said driving-shaft, a friction-clutch comprising a member adjustably mounted on one member of said first named clutch and a member journaled on said secondary shaft, a lever to operate both of said adjustable clutch members simultaneously, and a series of bevel gears connecting the secondary shaft with the clutch member journaled thereon.

4. Transmission gearing comprising a driving-shaft, a secondary shaft in line axially with the driving-shaft, a clutch having one cone adjustably mounted upon and driven by the driving-shaft, and one cone rigidly mounted on said secondary shaft, to drive the secondary shaft in the same direction as the driving-shaft, a clutch having one cone adjustably mounted on the cone carried by the driving-shaft, and a cone journaled on the secondary shaft, a train of miter-gears to connect the last named clutch to the secondary shaft to cause reversal of the same, and an element coöperating with the adjustable clutch members, for starting, stopping and reversing the secondary shaft through the parts aforesaid without stopping the driving-shaft.

5. In transmission gearing, the combination with a driving-shaft and a secondary shaft, of a friction-clutch comprising one member adjustably mounted on said driving-shaft, a key to drive the same from the shaft, and a second member, rigidly mounted on said secondary shaft, adapted for driving the same in the same direction as said driving-shaft, a friction clutch comprising a member adjustably mounted on one member of said first named clutch and driven thereby, and a member journaled on said secondary shaft, gears connecting the driven shaft and the last mentioned clutch member, an element coöperating with the adjustable clutch members for starting, stopping or reversing the travel of the secondary shaft through the parts aforesaid without stopping the driving shaft, and additional means whereby a number of machines may be driven in different directions at the same time.

6. In transmission gearing, the combination with a driving-shaft and a secondary shaft, in the same axial line, of a friction-clutch comprising a female member adjustably mounted on said driving-shaft, a key to drive the same from the shaft, and a male member rigidly mounted on said secondary shaft, whereby the same is driven in the same direction as said driving-shaft, a friction-clutch comprising a female member adjustably mounted on the female member of said first named clutch and driven by a series of guides, and a male member journaled on said secondary shaft, means for transmitting power to and for reversing the travel of said secondary shaft from said last mentioned clutch member, and means for effecting the engagement or disengagement of each of said clutches.

7. In transmission gearing, the combination with a frame and a driving-shaft and a secondary shaft disposed on said frame in the same axial line, of a friction-clutch comprising one member slidably mounted on said driving-shaft and a second member rigidly mounted on said secondary shaft, a friction-clutch comprising a member slidably mounted on one member of said first named clutch and a member journaled on said secondary shaft, means coöperating with said last mentioned clutch member for reversing the travel of said secondary shaft, yokes operatively fitted to like members of each clutch, a forked lever pivotally mounted on the opposite sides of the frame, and links to connect the lever to the opposite ends of each yoke adapted to coöperate with said lever for operating said clutches.

8. In transmission gearing, the combination with a driving-shaft and a secondary shaft in the same axial line, of a friction-clutch comprising a hollow cone adjustably mounted upon said driving-shaft, a key to drive the same from the shaft, and a cone rigidly mounted on said secondary shaft, a friction-clutch comprising a cone adjustably mounted on said hollow cone, driven by a series of guides, and a cone journaled on said secondary shaft, and a train of miter-gears to transmit the power derived from the driving-shaft and said last named clutch to said secondary shaft, thereby to effect the reversing of the same.

9. In transmission gearing, the combination with a driving-shaft and a secondary shaft, of a friction-clutch comprising a hollow cone adjustably mounted on said driving-shaft, a key to drive the same from the shaft, and a cone rigidly mounted on said secondary shaft, a friction-clutch comprising a cone adjustably mounted on said hollow cone and driven by a series of guides and a cone journaled on said secondary shaft, gears between the secondary shaft and the member journaled thereon, a common lever to operate both of said clutches, the said lever capable of being operated to set the members of one clutch in operative engagement, to drive in one direction, and at the same time disengage the members of the other clutch, and vice versa, the said lever also capable of being operated to disengage both of said clutches and thereby stop operation of said secondary shaft.

10. In transmission gearing, the combination with a driving-shaft and a secondary shaft in the same axial line, of a hollow cone slidably mounted upon said driving-shaft and having a central hub, a male cone rigidly mounted on said secondary shaft, adapted to be frictionally engaged by said hollow cone, a cone slidably mounted on said hollow cone, a second male cone journaled on said secondary shaft adapted to be frictionally engaged by the latter mentioned slidable cone, means associated with the last male cone for driving the secondary shaft in the opposite direction, a yoke operatively connected to said hollow cone, a yoke operatively connected to said other slidable cone, and a lever pivoted to the frame capable of engaging or disengaging each pair of cones for starting, stopping or reversing said secondary shaft.

11. Transmission gearing, comprising a driving-shaft, a hollow cone slidably mounted on said driving-shaft, a secondary shaft in line with said driving-shaft, a male cone rigidly mounted on said secondary shaft adapted to be frictionally engaged by said hollow cone and transmit power derived from said driving-shaft direct through said secondary shaft, a cone slidably mounted on said hollow cone, a series of guides carried by said hollow cone for driving the cone slidable thereon, a male cone journaled on said secondary shaft coaxial with the other cones, adapted to be frictionally engaged by the latter mentioned slidable cone, and means auxiliary to the foregoing for transmitting the power from the driving-shaft indirectly to the driven shaft.

12. Transmission gearing, comprising a driving-shaft, a hollow cone slidably mounted on said shaft, a secondary shaft disposed in line with said driving shaft, a male cone rigidly mounted on said secondary shaft, and adapted to be frictionally connected to said hollow cone for positively driving the secondary shaft in the same direction as said driving-shaft, a cone slidably mounted on said hollow cone, a series of guides to drive said latter slidable cone in the same direction as said hollow cone, a male cone journaled on said secondary shaft coaxial with all of said cones, gears associated with the last male cone for reversing said secondary shaft, and means for operating said slidable cones simultaneously, but in different directions for the purpose of stopping or reversing said secondary shaft.

In testimony whereof we affix our signatures in presence of two witnesses.

JOHN M. VAN DYKE.
FAYETTE R. ROWELL.

Witnesses:
J. W. WILSON,
J. W. McPHERSON.